United States Patent [19]
Nishioka

[11] Patent Number: 4,824,225
[45] Date of Patent: Apr. 25, 1989

[54] ILLUMINATION OPTICAL SYSTEM FOR AN ENDOSCOPE

[75] Inventor: Kimihiko Nishioka, Tokyo, Japan

[73] Assignee: Olympus Optical Co., Ltd., Tokyo, Japan

[21] Appl. No.: 205,483

[22] Filed: Jun. 1, 1988

Related U.S. Application Data

[63] Continuation of Ser. No. 945,951, Dec. 24, 1986, abandoned.

[30] Foreign Application Priority Data

Dec. 28, 1985 [JP] Japan .................................. 60-293645

[51] Int. Cl.$^4$ .................... G02B 13/18; G02B 6/32; G02B 23/26
[52] U.S. Cl. .................................. 350/432; 350/96.18; 350/96.26
[58] Field of Search ............ 350/432, 437, 574, 96.18, 350/96.26, 506

[56] References Cited

U.S. PATENT DOCUMENTS

| 4,266,534 | 5/1981 | Ogawa . | |
|---|---|---|---|
| 4,575,195 | 3/1986 | Hoogland | 350/432 |
| 4,662,725 | 5/1987 | Nisioka | 350/432 |
| 4,674,844 | 6/1987 | Nishioka et al. | 350/432 X |

Primary Examiner—John K. Corbin
Assistant Examiner—Ronald M. Kachmarik
Attorney, Agent, or Firm—Cushman, Darby & Cushman

[57] ABSTRACT

An illumination optical system for an endoscope comprising an illumination lens, which is provided on the object side of the light exiting end of a light projecting element and comprises at least one aspherical lens element, the illumination optical system for an endoscope being arranged to be applicable to a wide angle endoscope and, at the same time, being arranged to have a favorable light distribution characteristic, which ensures bright illumination up to the marginal portion of the field, and arranged that the loss in the intensity of light is small.

27 Claims, 9 Drawing Sheets

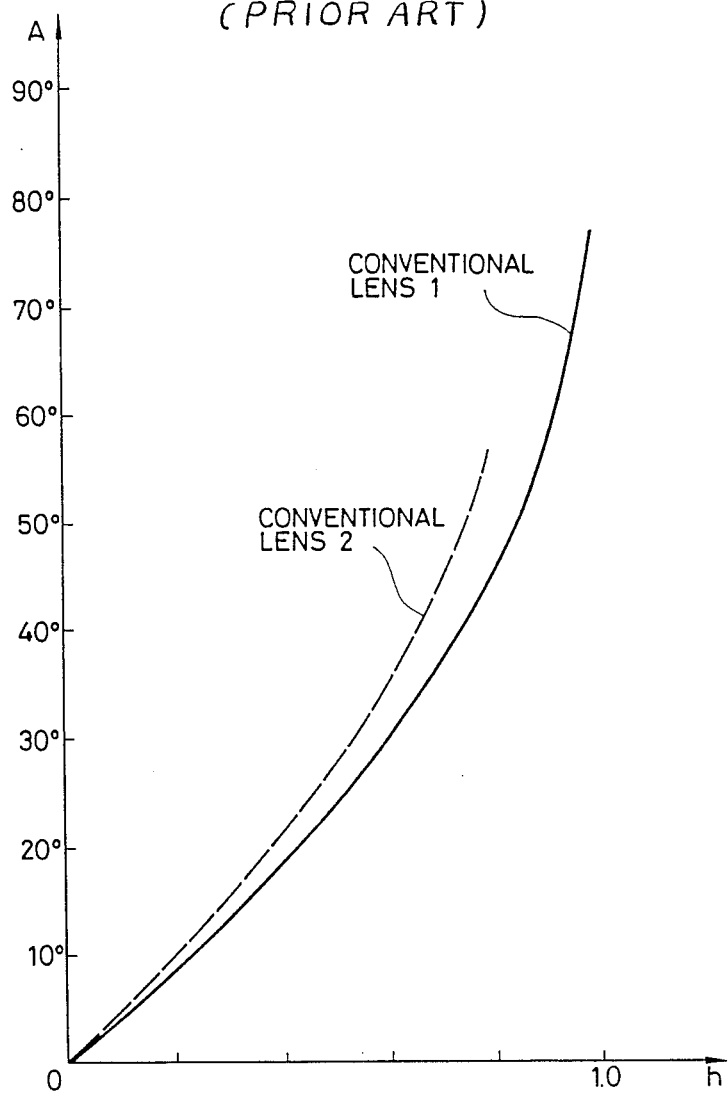

ILLUMINATION OPTICAL SYSTEM FOR AN ENDOSCOPE

This is a continuation of application Ser. No. 945,951, filed Dec. 24, 1986, which was abandoned upon the filing hereof.

BACKGROUND OF THE INVENTION (a) Field of the Invention

The present invention relates to an illumination optical system for an endoscope.

(b) Description of the Prior Art

Known illumination optical systems for endoscopes are generally composed as shown in FIG. 1. That is, an illumination lens 3 having a concave surface with strong curvature on the light guide side and having a strong diverging function is arranged in front of, i.e., on the object side of, the light exiting surface of a light guide 1 so that the light coming out from the light guide diverges to a wide area. However, the above-mentioned kind of illumination optical systems have a problem described below. That is, as the diverging angles of rays become larger toward the marginal portion of the illumination lens, the density of illumination rays becomes considerably low in the marginal portion of the illumination field and, consequently, the intensity of light in the marginal portion of thereof becomes considerably low. Besides, the rays that come out from the light exiting surface of the light guide at large angles in respect to the optical axis are scattered and lost by causing diffused reflection at the inner peripheral surface of the illumination lens or return to the light guide side without going out from the illumination lens by causing total reflection at the marginal portion of the front surface of the illumination lens. As a result, the brightness of illumination in the marginal portion of the illumination field becomes largely different from the brightness in the central portion thereof, and it is immmpossible to obtain uniform illumination over the whole illumination field.

To solve the above-mentioned problem, it is proposed to adopt an aspherical surface for an illumination lens. For example, Japanese published unexamined utility model application No. 17071/82 discloses an illumination optical system for an endoscope provided with an illumination lens which is arranged that the surface on the light guide side is formed as a complex surface, which has a central portion formed as a spherical surface and a marginal portion formed as a conical surface, and the surface on the object side is formed as a planar surface. However, in case of said known illumination optical system the above-mentioned problem is not solved satisfactorily, and the problem of lack of uniformity of illumination still remains.

Now, for known illumination optical systems for endoscopes, detailed description is given below regarding the problem of lack of uniformity of illumination, especially, regarding the problem that the intensity of light in the marginal portion of the illumination field becomes considerably different from the intensity of light in the central portion thereof.

The conventional illumination optical systems shown in FIG. 1 comprise illumination lenses having the numerical data shown below.

Conventional lens 1

| | | |
|---|---|---|
| $r_1 = \infty$ | | |
| $d_1 = 0.4545$ | $n_1 = 1.883$ | $\nu_1 = 40.78$ |
| $r_2 = 1.1818$ | | |

Conventional lens 2

| | | |
|---|---|---|
| $r_1 = \infty$ | | |
| $d_1 = 0.4545$ | $n_1 = 1.883$ | $\nu_1 = 40.78$ |
| $r_2 = 1.045$ | | |

In the numerical data shown in the above, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

Here, a ray which goes out from the light guide 1 in the direction parallel with the axis of the light guide is considered (said ray is hereinafter referred to as the principal ray) and, when the height of the principal ray is represented by reference symbol h, the angle formed by the principal ray after going out from the illumination lens in respect to the optical axis is represented by reference symbol A(h).

In case of the known illumination system shown in the above, A(h) sharply becomes large according to increase of h as shown in FIG. 2. This means that the density of principal rays becomes low in the marginal portion of the illumination field of the endoscope and, therefore, the brightness of illumination becomes low in the marginal portion. Here, the rays which go out from an optical fiber in the light guide is represented by the principal ray because, out of those rays, a ray which is closer to the state that the ray is parallel with the axis of the light guide has higher intensity of light.

Besides, when A(h) becomes considerably larger as the height of ray becomes higher (i.e., as h becomes larger), rays are largely refracted by the marginal portion of the illumination lens. This causes such phenomenon that rays partially come to the inner peripheral surface of the illumination lens and are thereby diffused and such phenomenon that incident angles of rays on the marginal portion of the front surface of the illumination lens become large and those rays partially return to the light source side by causing total reflection. As a result, the decrease of the intensity of light in the marginal portion is further promoted.

SUMMARY OF THE INVENTION

It is, therefore, a primary object of the present invention to provide an illumination optical system for an endoscope which is applicable to a wide angle endoscope and, at the same time, which is arranged that bright illumination is obtained up to the marginal portion of the field and the loss in the intensity of light is small.

To attain the above-mentioned object, the illumination optical system for an endoscope according to the present invention is arranged that the illumination lens thereof comprises at least one aspherical lens element having at least one aspherical surface expressed by the formula (1) shown below and that the shape of said aspherical surface is selected so as to fulfill the conditions (2), (3) and (4) shown below:

$$x = \frac{Cy^2}{1 + \sqrt{1 - PC^2y^2}} + by + By^2 + ey^3 + Ey^4 + \quad (1)$$
$$fy^5 + Fy^6 + \ldots$$

$$\frac{d^2}{dh^2}(\sin A(h)) \leq 0 \quad (2)$$

$$(0 \leq h \leq r)$$

$$\overline{\sin A} \geq 0.2588 \quad (3)$$

$$\left( \overline{\sin A} = \frac{1}{0.4r} \int_{0.6r}^{r} \sin A(h) dh \right)$$

$$|x_1| \leq |x_2| \quad (4)$$

where, $C=1/R$ (where, reference symbol R represents the raidus of curvature of the vertex portion of the aspherical surface), reference symbol y represents the radius measured from the optical axis (x axis), reference symbol P represents the constant of cone, reference symbols B, E, ... respectively represent coefficients of aspherical surface, reference symbol h represents the height of ray, reference symbol A(h) represents the angle between the principal ray and optical axis (x axis) formed after the principal ray passes through the aspherical surface, reference symbol r represents the the radius of an illuminating surface illuminated by a light source (where, in the case of the embodiment shown in FIG. 3, the light exiting surface of the light guide fiber bundle 1 operates as an illuminating surface to illuminate an object, and r represents the radius of the illuminating surface. In a case where a frosted glass is placed in front of a lamp so as to form an illuminating surface, r represents the radius of the said frosted glass plate, or in a case where a plurality of small light emitting diodes are placed side by side so as to form an illuminating surface, r represents the radius of the aggregate of the light emitting diodes.), reference symbol $x_1$ represents the difference between the x coordinate of the foremost point (point on the object side) and x coordinate of the rear most point (point on the light source side) on the first surface (surface on the object side) of the aspherical lens, and reference symbol $x_2$ represents the difference between the x coordinate of the foremost point (point on the object side) and x coordinate of the rearmost point (point on the light source side) on the second surface (surface on the light source side) of the aspherical lens. Besides, the origin of the coordinate system for the formula (1) is the intersecting point between the vertex portion of the aspherical surface and the optical axis as shown in FIG. 4. Respective parameters explained in the above are shown in FIGS. 3 and 9 which respectively illustrate preferred embodiments of the present invention.

Now, meanings of respective conditions shown in the above are described below.

The meaning of the condition (2) is as follows. As described before, in cases of the known illumination lenses, the lack of uniformity of the brightness of the illumination field is caused by the face that the value of A(h) becomes larger in the monotone increasing pattern as the value of h becomes larger. Therefore, when the increasing tendency of A(h) is suppressed, it is possible to increase the uniformity of illumination. Here, in case that the object has a spherical surface and the distal end of the endoscope is located at the center of curvature of the spherical surface, the value of dA/dh, i.e., the rate of increase of A in relation to increase of h, becomes constant when it is arranged that the formula $d^2A/dh^2=0$ is fulfilled and, consequently, the illumination becomes perfectly uniform. An endoscope is to be inserted to a narrow space such as a stomach and to be used for observation of the inside thereof. In most cases, the inner surface of such object to be observed is concave toward the distal end of the endoscope as shown in FIG. 5, and it is possible to apply the above-mentioned idea regarding the case that the object has a spherical surface. Therefore, when it is arranged that the formula $d^2A/dh^2 \approx 0$ is fulfilled, it is possible to improve the uniformity of illumination. Furthermore, an endoscope objectives have strong negative distortion, images of objects in the marginal portion become small and, therefore, it is permissible even when the marginal portion of the field is somewhat dark. In other words, it is all right when the value of d sinA/dh is approximately constant, i.e., when $d^2/dh^2$ (sin A(h))=0. On the other hand, when $d^2/dh^2$ (sin A(h))<0, the marginal portion of the field will become brighter. However, even in case of a substantially spherical inner surface such as an inner surface of a stomach, the object surface may be regarded as a substantially flat surface when the distal end of the endoscope is brought to a position very near the wall of the stomach. Besides, even when the marginal portion of the field becomes brighter, anything inconvenient will not be caused. Therefore, it is all right as far as the afore-mentioned condition (2), i.e., $d^2/dh^2$ (sin A(h))$\leq 0$, is fulfilled.

Here, h is supposed to be $0 \leq h \leq r$. However, it is not required that the condition (2) is fulfilled for all values of h but it is sufficient for practical use as far as the range of values of h where it becomes $d^2 \sin A/dh^2 \leq 0$ as shown in FIG. 8 exists in the range of $0 \leq h \leq r$. Besides, the practical light distribution characteristic will be also improved as far as such values of h that fulfill the formula $d^2 \sin A/dh^2 \leq 0$ exist in the state that they correspond to about 20% or more of the area of the light exiting surface of the light guide (or the light projecting surface of the light source). Furthermore, to make the light distribution to the marginal portion of the field favourable, it is preferable to arrange that the range of h where the condition (2) is fulfilled exists in the range of $h \geq 0.4r$. This is because, out of rays which come out from the light exiting surface of the light guide, rays more distant from the optical axis serve to illuminate the portion of the field more distant from the optical axis and, therefore, it is preferable, for improvement of the light distribution to the marginal portion of the field, to arrange that the condition (2) is fulfilled in the zone which is comparatively distant from the optical axis. Besides, it is preferable to further arrange that the condition (2) is fulfilled at least over the area of 0.15r in the range of $h \geq 0.4r$. This is because the light distribution characteristic might not be improved if the condition (2) is fulfilled in a very small area only. That is, as far as the condition (2) is fulfilled at least over the area of 0.15r in the range of $h \geq 0.4r$, the influence thereof is given to a considerable part of rays which come out from the light guide and are directed toward the marginal portion of the field and, therefore, the light distribution characteristic is improved more favourably.

Now, the meaning of the condition (3) is described below. In recent years, the field angle of endoscopes is becoming wider, and many of endoscopes have field angles about 90° to 130°. On the other hand, the light distribution angle of the light guide itself is about 60°. Therefore, it is necessary to widen the light distribution angle by 30° or more by using a lens. For this purpose, it is all right when the lens serves to refract the principal rays by refraction angles of 15° or more. Here, the marginal portion of the field is illuminated by rays in the range where h is large, i.e., rays in the range where the height of ray is about $h \geq 0.8r$. Therefore, it is all right when the relation $A(0.8r) \geq 15°$ is fulfilled. In other words, it is all right when the condition (5) shown below is fulfilled.

$$\sin A\ (0.8r) \geq 0.2588 \qquad (5)$$

This means that, when the mean value of sin A in the marginal portion of the light guide is regarded as $$\overline{\sin A} = \frac{1}{0.4r} \int_{0.6r}^{r} \sin A(h)dh$$

it is all right when the relation $$\overline{\sin A} \geq 0.2588$$

is fulfilled. That is, it is all right when the condition (3) is fulfilled.

Now, the meaning of the condition (4) is explained below. The condition (4) defines the relation between $x_1$ and $x_2$ where, as shown in FIG. 9, reference symbol $x_1$ represents the difference between the x coordinate of the foremost point $O_1$ (point on the object side) and x coordinate of the rearmost point $G_1$ (point on the light source side) on the first surface of the aspherical lens, and reference symbol $x_2$ represents the difference between the x coordinate of the foremost point $O_2$ (point on the object side) and x coordinate of the rearmost point (point on the light source side) on the second surface of the aspherical lens. Here, when the light exiting surface of the light guide comes to a position closer to the object side compared with the rearmost point on the second surface of the lens as shown in FIG. 9, reference symbol $x_2$ represents the difference between the x coordinate of the point $O_2$ and x coordinate of the light exiting surface $G_2$ of the light guide.

As it will be understood from FIG. 9, $x_1$ and $X_2$ respectively correspond to approximate values of refractive powers of the first and second surfaces and, therefore, the condition (4) means that the refractive power of the second surface is stronger than that of the first surface.

In case that the relation between $x_1$ and $x_2$ becomes $x_1 > x_2$, the refractive power of the first surface becomes stronger than that of the second surface. As a result, total reflection of rays l' with large NA tends to be caused, and the loss in the intensity of light beocmes large.

FIG. 10 shows an example of a lens which fulfills the condition (4).

As described so far, the aspherical lens in the illumination optical system for an endoscope according to the present invention is arranged that at least one of the first and second surfaces thereof is formed as an aspherical surface with a shape expressed, for example, by the formula (1) and said aspherical surface may be formed either as a concave surface or as a convex surface and, moreover, may be formed as a surface whose sectional profile has a plural number of concave and convex portions. Besides, said aspherical lens is arranged to fulfill the conditions (2), (3) and (4). The illumination optical system for an endoscope according to the present invention comprising the above-mentioned aspherical lens makes it possible to attain the object of the present invention as described already.

It is difficult to analytically obtain a solution for the shape of an aspherical surface which fulfills said conditions (2), (3) and (4). However, it is possible to obtain the shape when the ray tracing method by a computer is adopted in the same way as the case that it is applied to imaging lenses in general.

The shape of the aspherical surface of the aspherical lens to be adopted in the illumination optical system according to the present invention is not limited to a surface which is rotationally symmetrical round x axis (optical axis). To eliminate the parallax in relation to the objective 4, at least one surface may be made eccentric by $\delta$ or tilted as shown in FIG. 12. In that case, when the illumination lens comprises a plural number of lens elements, it is possible to obtain the same effect as above when the illumination lens as a whole or at least one lens element thereof is made eccentric or tilted.

In case that a curved surface of a lens is arranged to have a shape which is not rotationally symmetrical round x axis as described in the above, it is all right as far as said curved surface is arranged to have an aspherical shape expressed by the formula (1) in the state that the lens is sectioned by a plane containing the axis which approximately passes the center of at least one optical fiber in the light guide. When the aspherical surface, which is determined as above and expressed by the formula (1), is arranged to fulfill the conditions (2), (3) and (4), it is possible to obtain an illumination lens which produces favourable light distribution and serves to attain the object of the present invention.

The cross-sectional shape of the light guide is not limited to a circular shape. For example, there exists a light guide with a square cross-sectional shape as shown in FIG. 13. In case of such light guide, the illumination lens according to the present invention may be arranged to have a curved surface having a shape with four-fold rotation symmetry as shown in said figure. FIG. 14 shows the shape of said curved surface in y and u directions. When the cross-sectional shape of the light guide is not circular as mentioned in the above, r in the condition (3) may be determined by converting the cross section of that light guide into a circle with the equal area.

Furthermore, instead of a curved surface expressed by the formula (1), it is also possible to adopt a surface whose sectional profile is obtained when a curved line is approximated by combining short straight line segments as shown in FIG. 15. Besides, it is also possible to adopt a surface whose sectional profile is obtained when a curved line is approximated by combining short straight line segments and short curved line segments as shown in FIG. 16. When adopting a surface whose sectional profile is obtained by approximating a curved line by combining short straight line segments or by combining short straight line segments and short curved line segments as mentioned in the above, portions corresponding to joint portions between line segments will become somewhat pointed. In case that such surface is adopted as the surface on the object side of the lens, the object might be injured. Therefore, it is preferable to adopt such surface as a surface on the image side.

Furthermore, it is possible to apply the idea according to the present invention also to a lens having a curved surface with a shape as shown in FIG. 17, i.e., a curved surface formed by combining two different aspherical surfaces. In that case, it is all right as far as said curved surface is formed that an arbitrary portion of the two aspherical surfaces fulfills the formula $d^2 \sin A/dh^2 \leq 0$. Besides, in the same way as the case of a single aspherical surface described already, it is more preferable when such values of h that fulfill the above-mentioned formula exist in the state that they correspond to about 20% or more of the area of the light exiting surface of the light guide, the range of h where the condition (2) is fulfilled exists in the range of $h \geq 0.4r$ and, moreover, it is further arranged that the condition (2) is fulfilled at least over the area of 0.15r in the range of $h \geq 0.4r$.

Furthermore, the illumination optical system according to the present invention may be composed that an illumination lens comprising two or more aspherical lens elements is arranged in front of a light guide as shown in FIG. 18. In that case, it is sufficient when the conditions (2) and (3) are applied to the rays which already passed the two (the plural number of) aspherical lens elements, and the condition (4) is applied to at least one of the aspherical lens elements.

In the present invention, the term "aspherical surface" is used in the meaning that it includes such surface whose sectional profile is obtained by approximating a curved line by combining short straight line segments or combining short straight line segments and short curved line segments as described before.

BRIEF DESCRIPTION OF THE DRAWINGS

FIG. 2 shows a graph illustrating the relation between values of A and values of h of known illumination lenses of known illumination optical systems;

DETAILED DESCRIPTION OF THE PREFERRED EMBODIMENTS

Now, preferred embodiments of the illumination lens for the illumination optical system for an endoscope according to the present invention are shown below.

Embodiment 1

$r_1 = \infty$ (aspherical surface)
$d_1 = 0.4545$ $n_1 = 1.883$ $\nu_1 = 40.78$
$r_2 = 1.1364$
$P_1 = 1$
$x_1 = 0.059$, $x_2 = 0.8182$, $y_{max} = 1.30$
$B_1 = -0.55 \times 10^{-1}$, $E_1 = 0.6442 \times 10^{-2}$

Embodiment 2

$r_1 = \infty$ (aspherical surface)
$d_1 = 0.4545$ $n_1 = 1.883$ $\nu_1 = 40.78$
$r_2 = 1.2627$
$P_1 = 1$
$x_1 = 0.092$, $x_2 = 0.6278$, $y_{max} = 1.368$
$B_1 = -0.715 \times 10^{-1}$, $E_1 = 0.6442 \times 10^{-2}$

Embodiment 3

$r_1 = \infty$ (aspherical surface)
$d_1 = 0.4545$ $n_1 = 1.883$ $\nu_1 = 40.78$
$r_2 = 1.1364$ (aspherical surface)
$P_1 = 1$ $P_2 = 1$
$x_1 = 0.046$, $x_2 = 0.8181$, $y_{max} = 1.18$
$B_1 = -0.55 \times 10^{-1}$, $F_1 = 0.6442 \times 10^{-2}$
$F_2 = 0.6442 \times 10^{-2}$

Embodiment 4

$r_1 = \infty$ (aspherical surface)
$d_1 = 0.4545$ $n_1 = 1.883$ $\nu_1 = 40.78$
$r_2 = 1.2627$
$P_1 = 1$
$x_1 = 0.1$, $x_2 = 0.6273$, $y_{max} = 1.53$
$B_1 = -0.88 \times 10^{-1}$, $E_1 = 0.29282 \times 10^{-1}$

Embodiment 5

$r_1 = \infty$ (aspherical surface)
$d_1 = 0.4545$ $n_1 = 1.883$ $\nu_1 = 40.78$
$r_2 = 1.2627$ $P_1=1$, $x_1=0$, $x_2=0.6273$
$F_1=0.19197\times 10^{-1}$

Embodiment 6

$r_1=\infty$
$d_1=0.4545$ $n_1=1.883$ $\nu_1=40.78$
$r_2=\infty$ (aspherical surface)
$P_2=1$, $B_2=0.44$

Embodiment 7

$r_1=\infty$
$d_1=0.4545$ $n_1=1.883$ $\nu_1=40.78$
$r_2=\infty$ (aspherical surface)
$P_2=1$, $B_2=0.55$

Embodiment 8

$r_1=\infty$
$d_1=0.4545$ $n_1=1.883$ $\nu_1=40.78$
$r_2=\infty$ (aspherical surface)
$P_2=1$, $B_2=0.66$

Embodiment 9

Figure 1:
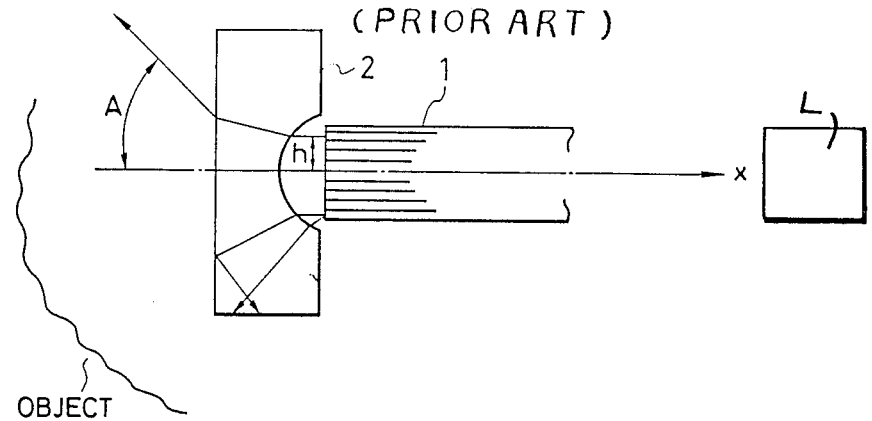
FIG. 1 shows a sectional view illustrating the composition of known illumination optical systems.
Figure 3:
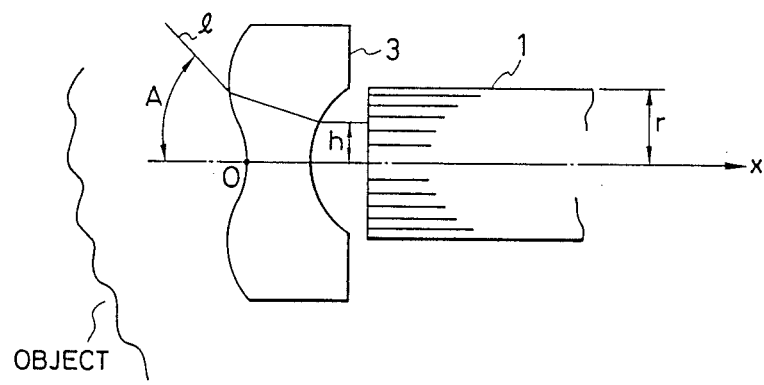
FIG. 3 shows a sectional view illustrating the composition of the illumination optical system for an endoscope according to the present invention.
Figure 4:
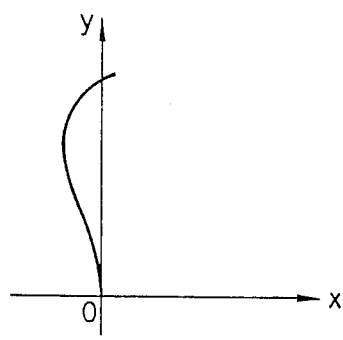
FIG. 4 shows a coordinate system representing the formula which expresses an aspherical surface adopted in the present invention.
Figure 5:
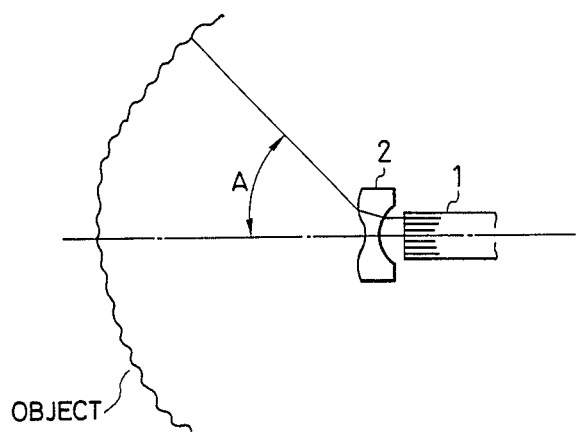
FIG. 5 shows a sectional view illustrating the light distribution of an illumination optical system comprising an aspherical lens.
Figure 8:
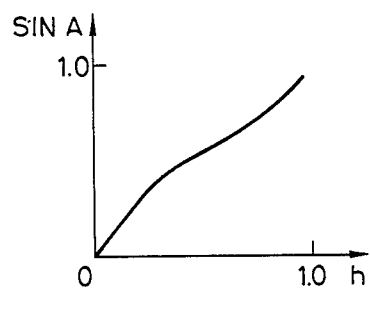
FIG. 8 shows a graph illustrating an example of the relation between values of sin A and values of h of the illumination optical system according to the present invention.
Figure 9:
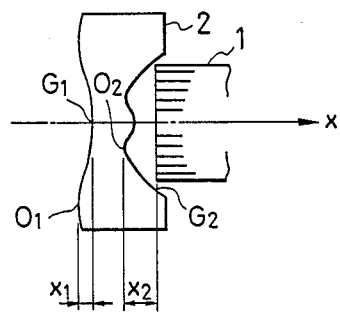
FIGS. 9 through 11 respectively show sectional views of illumination optical systems shown for the purpose of explanation of the condition (4) given in the present invention.
Figure 10:
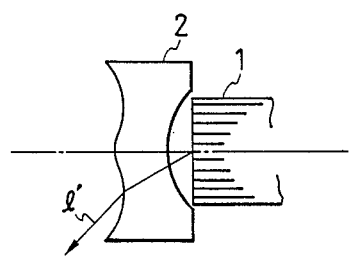
Figure 11:
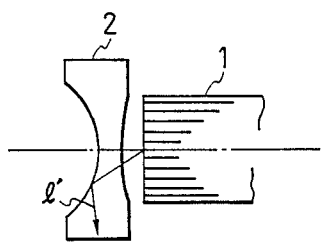

$r_1=\infty$
$d_1=0.4545$ $n_1=1.883$ $\nu_1=40.78$
$r_2=\infty$ (aspherical surface)
$P_2=1$, $B_2=0.55$, $E_2=-0.6442\times 10^{-2}$ In respective embodiments shown in the above, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens. The numerical data of respective embodiments shown in the above are normallized to the state of $r=1$ where reference symbol r represents the radius of the illuminated surface illuminated by the light source such as the light source L schematically illustrated in FIG. 1.

Figure 7:
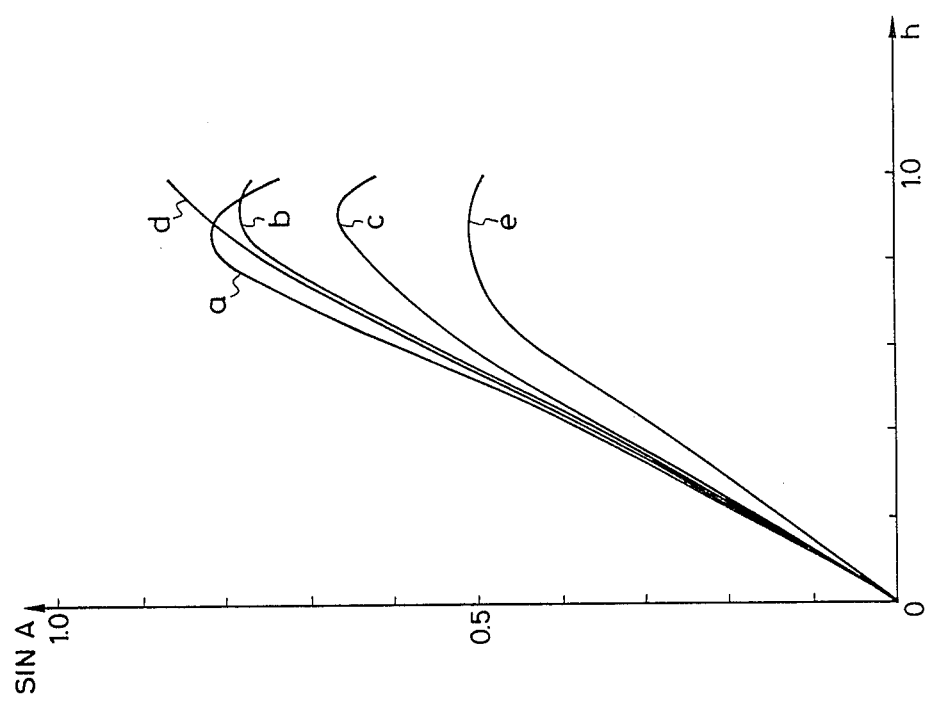
FIG. 7 shows a graph illustrating the relation between values of sin A and values of h of illumination lenses in Embodiments 1 through 5 of the present invention.
Figure 6:
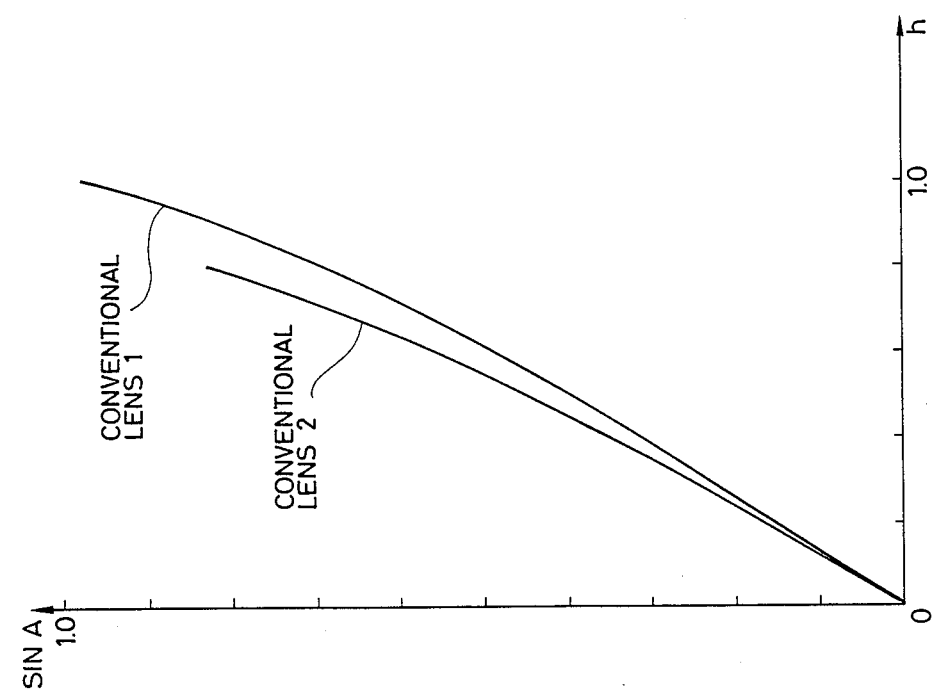
FIG. 6 shows a graph illustrating the relation between values of sin A and values of h of known illumination lenses.
Figure 12:
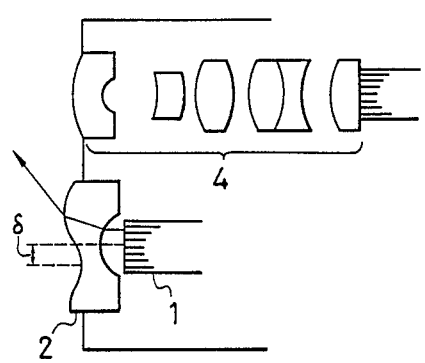
FIG. 12 shows a sectional view illustrating the composition of the illumination optical system according to the present invention in the state that the parallax is eliminated.
Figure 13:
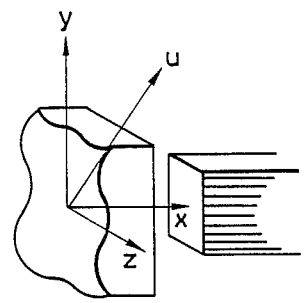
FIG. 13 shows a perspective view of the illumination optical system according to the present invention which is to be used in combination with a light guide having a square cross-sectional shape.
Figure 14:
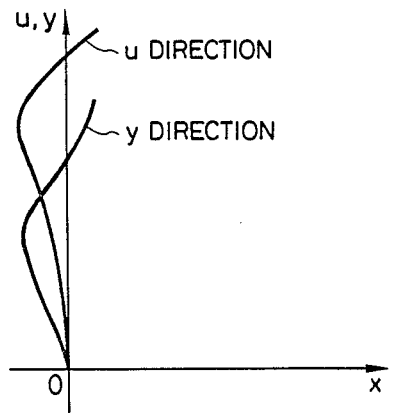
FIG. 14 shows the sectional shape of the curved surface of the aspherical lens shown in FIG. 13.
Figure 15:
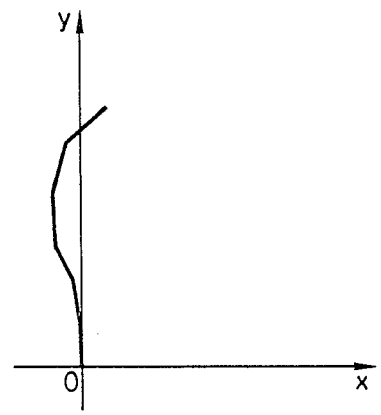
FIGS. 15 through 17 respectively show sectional profiles of other examples of aspherical surfaces to be adopted for aspherical lenses to be used in the present invention.
Figure 16:
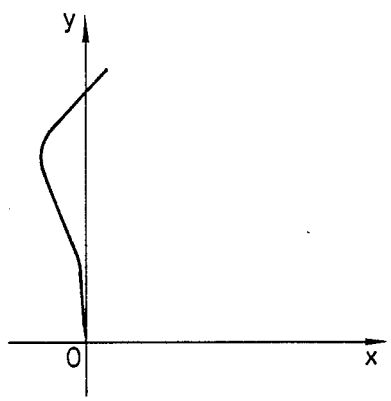
Figure 17:
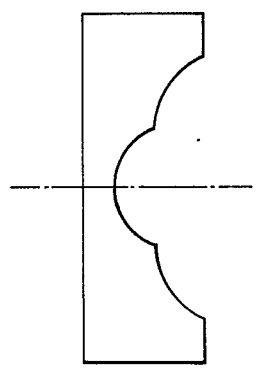
Figure 18:
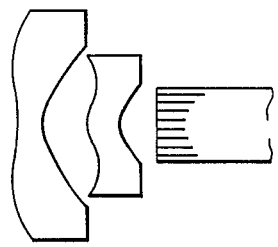
FIG. 18 shows a sectional view of another example of the illumination optical system according to the present invention wherein a plural number of aspherical lens elements are adopted.

FIG. 7 shows a graph illustrating the curves of sin A in relation to h obtained from the illumination lenses in some of preferred embodiments of the present invention, and FIG. 6 shows a graph illustrating the curves of sin A in relation to h obtained from known illumination lenses.

As it will be understood from said figures, in case of FIG. 7 (present invention) the curves are convex toward the top of the graph, i.e., $d^2\sin A/dh^2<0$. On the other hand, in case of FIG. 6 (know illumination lenses), the curves shown in the graph are convex toward the bottom of the graph, i.e., $d^2\sin A/dh^2>0$. In other words, in cases of the embodiments of the present invention, the density of rays is approximately uniform also in the marginal portion of the field or becomes somewhat higher toward the marginal portion. On the other hand, in cases of the known illumination lenses, the density of rays becomes lower toward the marginal portion of the field.

Figure 19:
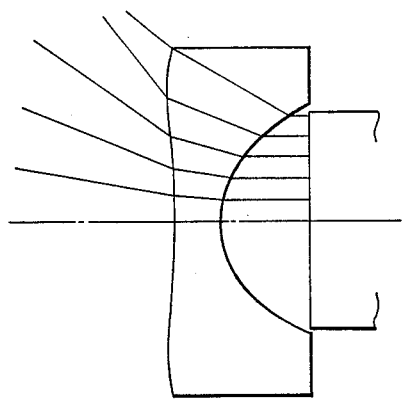
FIGS. 19 through 27 respectively show sectional views of Embodiments 1 through 9 of the present invention.
Figure 20:
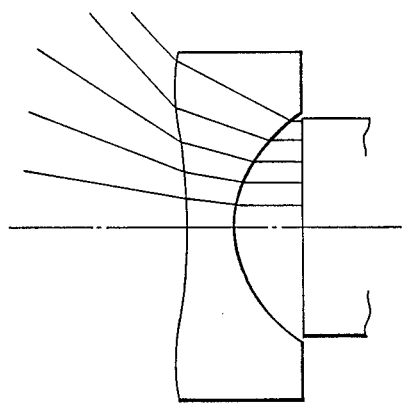

The illumination lenses in Embodiments 1 and 2 are respectively shown in FIGS. 19 and 20 and are arranged that the first surface thereof is formed as an aspherical surface. The curves of sin A of the illumination lenses in said embodiments are as shown by the curves a and b in FIG. 7.

Figure 21:
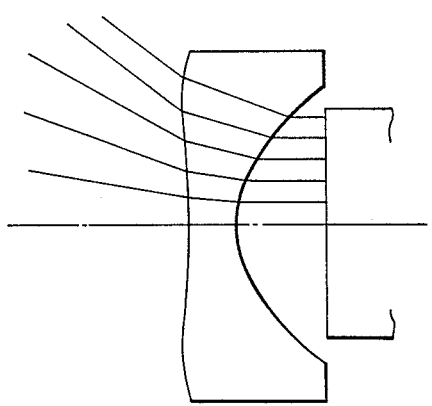

The illumination lens in Embodiment 3 is shown in FIG. 21 and is arranged that both of the first and second surface thereof are formed as aspherical surfaces. In case of the illumination lens in Embodiment 3, the second surface is formed that the curvature of the marginal portion is weak. Therefore, rays which come to the inner peripheral surface of the lens are not many and, consequently, it is possible to obtain bright illumination. The curve of sin A of the illumination lens in Embodiment 3 is as shown by the curve c in FIG. 7.

Figure 22:
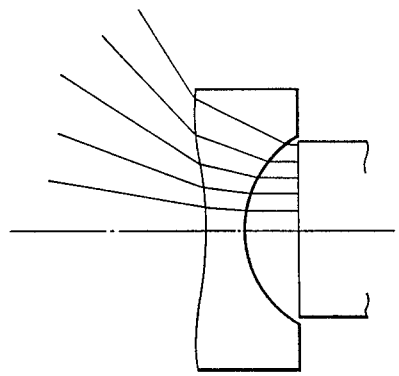

The illumination lens in Embodiment 4 is shown in FIG. 22 and is arranged that the first surface thereof is formed as an aspherical surface. In case of the aspherical surface of the illumination lens in Embodiment 4, the coefficients of aspherical surface of the second and fourth orders are not zero unlike those of Embodiments 1 and 2. The curve of sin A of the illumination lens in Embodiment 4 is as shown by the curve d in FIG. 7.

The illumination lenses in Embodiment 1 through 4 described so far are respectively arranged that the first surface thereof has a concave central portion and a convex marginal portion. This has such effect to prevent the rays other than the principal rays, i.e., the rays with large NA, from causing total reflection at the marginal portion of the first surface of the lens and to thereby make the light distribution favourable. When the distance from the foremost point on the above-mentioned convex marginal portion to the optical axis is represented by reference symbol y (max), it is preferable to arrange that $y_{max} \geq \frac{1}{2}r$. If y (max) is made smaller than $\frac{1}{2}r$, the positive refractive action of the marginal portion of the lens becomes too strong, and the light distribution angle becomes small.

Figure 23:
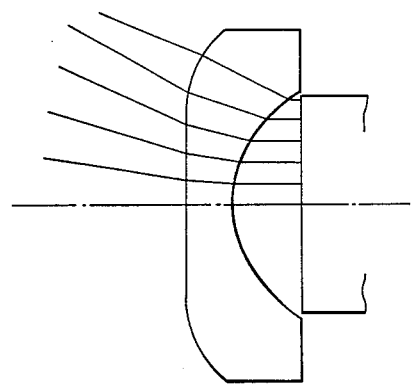

The illumination lens in Embodiment 5 is shown in FIG. 23 and is arranged that the first surface thereof is formed as an aspherical surface. However, the central portion of said first surface is not concave. In case of the illumination lens in Embodiment 5, it is possible to obtain a uniform light distribution though the light distribution angle is small. The curve of sin A of the illumination lens in Embodiment 5 is as shown by the curve e in FIG. 7.

Figure 24:
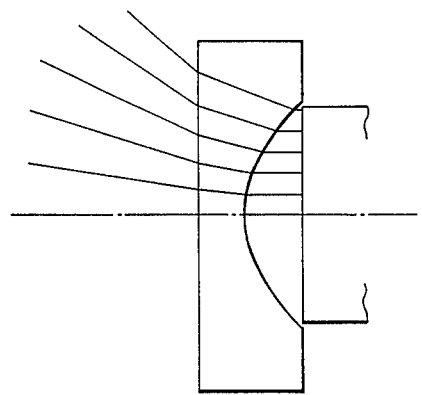
Figure 25:
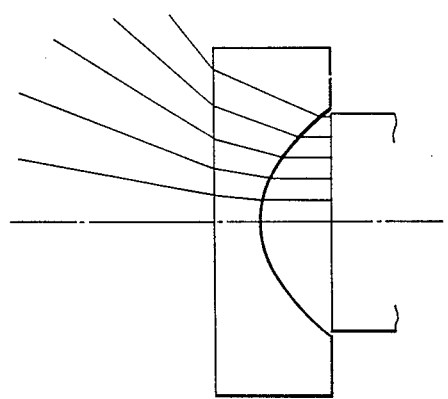
Figure 26:
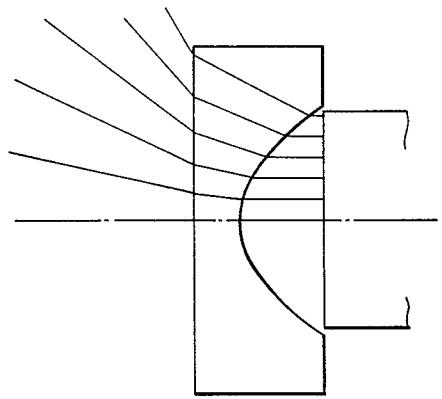

The illumination lenses in Embodiments 6, 7 and 8 are respectively shown in FIGS. 24, 25 and 26 and are respectively arranged that the second surface thereof is formed as a paraboloid. Out of them, the paraboloid of the illumination lens in Embodiment 6 has the weakest curvature while the paraboloid of the illumination lens in Embodiment 8 has the strongest curvature. Therefore, the light distribution angle becomes larger in the order of Embodiments 6, 7 and 8.

In cases of Embodiments 6, 7 and 8, the second surface is formed that the curvature of the marginal portion is weak. Therefore, rays which come to the inner peripheral surface of the lens are not many and, consequently, the loss in the intensity of light is small. Besides, as the curved surface does not have an inflection point, it is convenient for the manufacture. Furthermore, in cases of these embodiments, it is preferable to arrange that the coefficient B of aspherical surface of the second order becomes $B \geq 0.2$. If it becomes $B<0.2$, the curvature of the paraboloid becomes too weak. As a result, the intensity of light in the marginal portion of the illumination field becomes insufficient, and the performance becomes unsatisfactory.

Figure 29:
FIG. 29 shows a graph illustrating the relation between values of sin A and values of h of Embodiments 6 through 9 of the present invention.

The curves of sin A of Embodiments 6, 7 and 8 are respectively shown by the curves f, g and h in FIG. 29.

Figure 28:
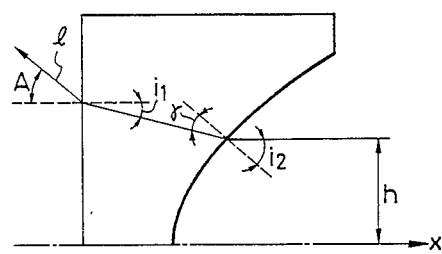
FIG. 28 shows a sectional view illustrating the state of refraction of a principal ray by an aspherical lens whose aspherical surface is formed as a paraboloid.

In cases of Embodiments 6, 7 and 8, when the first surface is formed as a planar surface and the second surface is formed as a paraboloid, sin A is analytically expressed as a function of h, B (coefficient of aspherical surface of the second order) and n (refractive index of the lens). Here, $i_2$, $\gamma_2$ and $i_1$ shown in FIG. 28 are respectively defined as follows.

$$i_2 = \tan^{-1} 2By$$

$$\sin \gamma_2 = 1/n \sin(\tan^{-1} 2By)$$

$$i_1 = i_2 - \gamma_2$$

Hence, sin A becomes as follows:

$$\sin A = n \sin i_1 = n \sin[(\tan^{-1} 2By) - \sin^{-1}\{1/n \sin (\tan^{-1} 2By)\}] \quad (6)$$

Therefore, when the formula (6) is solved by defining as $y = 0.8r$, $A = 15°$ and $n = 1.5 \sim 1.9$, it is possible to determine the lowest limit value of B which fulfills the condition (5). Besides, for the condition (3), it is also possible to obtain the lowest limit value of B in the same way as above.

Furthermore, in cases of Embodiments 6, 7 and 8, when the first surface is formed as a planar surface and the second surface is formed as an aspherical surface expressed by the formula (1) (where $P \neq 0$), sin A becomes as follows. That is, when the equation of the second surface is expressed as $x = f(S)$, $\tan i_2$ becomes as follows:

$$\tan i_2 = df/ds$$

Hence, sin A becomes as follows:

$$\sin A = n \sin[\tan^{-1}(df/ds) - \sin^{-1}\{1/n \sin (\tan^{-1} df/ds)\}] \quad (7)$$

Therefore, when the formula (7) is solved by defining as $y = 0.8r$, $A = 15°$ and $n = 1.5 \sim 1.9$ it is possible to obtain the values of C and coefficients of aspherical surface which fulfill the condition (5).

Therefore, when a lens which fulfills the condition (3) is formed by using the formula (6) or (7), it is possible to obtain an illumination optical system whose light distribution characteristic is favourable.

Figure 27:
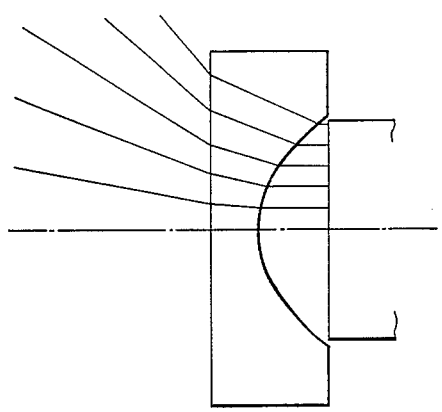

The illumination lens in Embodiment 9 is shown in FIG. 27 and is arranged that the second surface thereof is formed as a surface of the sixth order. In case of the illumination lens in Embodiment 9, the loss in the intensity of light is smaller compared with those in Embodiments 6, 7 and 8. The curve of sin A of the illumination lens in Embodiment 9 is as shown by the curve i in FIG. 29.

All the aspherical surfaces adopted in the preferred embodiments described so far are arranged as paraboloids, i.e., $P = 1$. However, it is possible to obtain the same effect also when an ellipsoid ($0 < P < 1$) or hyperboloid ($P < 0$) is adopted as an aspherical surface.

Besides, a light projecting element such as a light emitting diode, semiconductor laser, lamp or the like may be used instead of the light guide. In those case, the term "radius r of the light source" shown in the description so far is to be taken as follows. That is, in case of a lamp, r represents the distance from the optical axis to the end of the filament of the lamp and, in case of a light emitting diode or semiconductor laser, r represents the distance from the optical axis to the periphery of the light emitting surface thereof (in case that a plurality of light emitting diodes are placed side by side so as to form a light source, r represents the distance from the optical axis to the periphery of the light emitting surface of the light emitting diode located at the position most distant from the optical axis).

Furthermore, when the aspherical surface is formed by pressing of a glass material or by plastic molding, it is possible to reduce the cost of production.

I claim:

1. An illumination optical system for an endoscope comprising an illumination lens including at least one aspherical lens element and a light source having a light emitting surface of a certain size in a direction perpendicular to the optical axis of said illumination lens, said illumination optical system for an endoscope fulfilling the conditions (2), (3) and (4) shown below wherein:

the inequality of $d^2/dh^2\{\sin A(h)\} \leq 0$ establishes for at least certain values of the variable h within a range of $$2 \leq h \leq r. \quad (2)$$

$$\overline{\sin A} \geq 0.2588 \quad (3)$$

$$\left\{ \overline{\sin A} \leq \frac{1}{0.4r} \int_{0.6r}^{r} \sin A(h) dh \right\}$$

$$[x_1] \leq [x_2] \quad (4)$$

where, reference symbol h represents the height of ray emitted from said light source and incident on said illumination lens, reference symbol A(h) represents the refraction angle of the ray, whose height of the ray is h, measured from the optical axis after said ray passes through the aspherical lens element, reference symbol r represents the distance measured from the optical axis on the light-emitting surface of said light source to the end thereof, reference symbol $x_1$ represents the difference between the positions of the foremost point and the rearmost point on the first surface of the illumination lens measured in the direction of the optical axis, and reference symbol $x_2$ represents the difference between the positions of the foremost point and the rearmost point on the second surface of the illumination lens measured in the direction of the optical axis.

2. An illumination optical system for an endoscope according to claim 1 wherein the first surface of said illumination lens is formed as an aspherical surface.

3. An illumination optical system for an endoscope according to claim 2 wherein said first surface formed as an aspherical surface is formed that the central portion thereof is concave and the marginal portion thereof is convex.

4. An illumination optical system for an endoscope according to claim 2 wherein said first surface formed as an aspherical surface is formed that the central portion thereof is flat.

5. An illumination optical system for an endoscope according to claim 2 wherein said aspherical surface has a shape expressed by the formula (1) shown below:

$$x = \frac{Cy^2}{1 + \sqrt{1 - PC^2 y^2}} + by + By^2 + ey^3 + Ey^4 + \quad (1)$$

$$fy^5 + Fy^6 + \ldots$$

where, $C = 1/R$ (where, reference symbol R represents the radius of curvature of the vertex portion of the aspherical surface), reference symbol y represents the radius measured from the optical axis, reference symbol P represents the constant of cone, and reference symbols B, E, ... respectively represent coefficients of aspherical surface,
and wherein said illumination lens has the following numerical data:

$r_1 = \infty$ (aspherical surface)

$d_1 = 0.4545$  $n_1 = 1.883$  $\nu_1 = 40.78$ $r_2 = 1.1364$ $P_1 = 1$ $x_1 = 0.059$, $x_2 = 0.8182$  Smm = 1.30

$B_1 = -0.55 \times 10^{-1}$, $E_1 = 0.6442 \times 10^{-2}$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

6. An illumination optical system for an endoscope according to claim 2 wherein said aspherical surface has a shape expressed by the formula (1) shown below:

$$x = \frac{Cy^2}{1 + \sqrt{1 - PC^2y^2}} + by + By^2 + ey^3 + Ey^4 + \quad (1)$$

$$fy^5 + Fy^6 + \ldots$$

where, C = 1/R (where, reference symbol R represents the radius of curvature of the vertex portion of the aspherical surface), reference symbol y represents the radius measured from the optical axis, reference symbol P represents the constant of cone, and reference symbols B, E, ... respectively represent coefficients of aspherical surface,
and wherein said illumination lens has the following numerical data:

$r_1 = \infty$ (aspherical surface)
$d_1 = 0.4545$  $n_1 = 1.883$  $\nu_1 = 40.78$
$r_2 = 1.2627$
$P_1 = 1$
$x_1 = 0.092$, $x_2 = 0.6278$, Smm = 1.368
$B_1 = -0.715 \times 10^{-1}$, $E_1 = 0.6442 \times 10^{-2}$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

7. An illumination optical system for an endoscope according to claim 2 wherein said aspherical surface has a shape expressed by the formula (1) shown below:

$$x = \frac{Cy^2}{1 + \sqrt{1 - PC^2y^2}} + by + By^2 + ey^3 + Ey^4 + \quad (1)$$

$$fy^5 + Fy^6 + \ldots$$

where, C = 1/R (where, reference symbol R represents the radius of curvature of the vertex portion of the aspherical surface), reference symbol y represents the radius measured from the oprical axis, reference symbol P represents the constant of cone, and reference symbols B, E, ... respectively represent coefficients of aspherical surface,
and wherein said illumination lens has the following numerical data:
$r_1 = \infty$ (aspherical surface)
$d_1 = 0.4545$  $n_1 = 1.883$  $\nu_1 = 40.78$
$r_2 = 1.2627$
$P_1 = 1$
$x_1 = 0.1$, $x_2 = 0.6273$, Smm = 1.53
$B_1 = -0.88 \times 10^{-1}$, $E_1 = 0.29282 \times 10^{-1}$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

8. An illumination optical system for an endoscope according to claim 2 wherein said aspherical surface has a shape expressed by the formula (1) shown below:

$$x = \frac{Cy^2}{1 + \sqrt{1 - PC^2y^2}} + by + By^2 + ey^3 + Ey^4 + \quad (1)$$

$$fy^5 + Fy^6 + \ldots$$

where, C = 1/R (where, reference symbol R represents the radius of curvature of the vertex portion of the aspherical surface), reference symbol y represents the radius measured from the optical axis, reference symbol P represents the constant of cone, and reference symbols B, E, ... respectively represent coefficients of aspherical surface,
and wherein said illumination lens has the following numerical data:
$r_1 = \infty$ (aspherical surface)
$d_1 = 0.4545$  $n_1 = 1.883$  $\nu_1 = 40.78$
$r_2 = 1.2627$
$P_1 = 1$, $x_1 = 0$, $x_2 = 0.6273$
$F_1 = 0.19197 \times 10^{-1}$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

9. An illumination optical system for an endoscope according to claim 2 wherein said first surface of said illumination lens formed as an aspherical surface is formed that the central portion thereof is convex and the marginal portion thereof is concave.

10. An illumination optical system for an endoscope according to claim 1 wherein the second surface of said illumination lens is formed as an aspherical surface.

11. An illumination optical system for an endoscope according to claim 10 wherein the second surface of said illumination lens is formed as a paraboloid.

12. An illumination optical system for an endoscope according to claim 11 wherein said paraboloid is expressed by the formula (1) shown below:

$$x = \frac{Cy^2}{1 + \sqrt{1 - PC^2y^2}} + by + By^2 + ey^3 + Ey^4 + fy^5 + Fy^6 + \ldots \quad (1)$$

where, $C=1/R$ (where, reference symbol R represents the radius of curvature of the vertex portion of the paraboloid), reference symbol y represents the radius measured from the optical axis, reference symbol P represents the constant of cone, and reference symbols B, E, ... respectively represent coefficients of aspherical surface, and wherein said illumination lens has the following numerical data:

$r_1 = \infty$
$d_1 = 0.4545$  $n_1 = 1.883$  $\nu_1 = 40.78$
$r_2 = \infty$ (aspherical surface)
$P_2 = 1$, $B_2 = 0.55$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

13. An illumination optical system for an endoscope according to claim 11 wherein said paraboloid is expressed by the formula (1) shown below:

$$x = \frac{Cy^2}{1 + \sqrt{1 - PC^2y^2}} + by + By^2 + ey^3 + Ey^4 + fy^5 + Fy^6 + \ldots \quad (1)$$

where, $C=1/R$ (where, reference symbol R represents the radius of curvature of the vertex portion of the paraboloid), reference symbol y represents the radius measured from the optical axis, reference symbol P represents the constant of cone, and reference symbols B, E, ... respectively represent coefficients of aspherical surface, and wherein said illumination lens has the following numerical data:

$r_1 = \infty$
$d_1 = 0.4545$  $n_1 = 1.883$  $\nu_1 = 40.78$
$r_2 = \infty$ (aspherical surface)
$P_2 = 1$, $B_2 = 0.66$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

14. An illumination optical system for an endoscope according to claim 10 wherein the coefficient B of said aspherical surface of the second order becomes $B \geq 0.2$.

15. An illumination optical system for an endoscope according to claim 1 wherein said paraboloid is expressed by the formula (1) shown below:

$$x = \frac{Cy^2}{1 + \sqrt{1 - PC^2y^2}} + by + By^2 + ey^3 + Ey^4 + fy^5 + Fy^6 + \ldots \quad (1)$$

where, $C=1/R$ (where, reference symbol R represents the radius of curvature of the vertex portion of the paraboloid), reference symbol y represents the radius measured from the optical axis, reference symbol P represents the constant of cone, and reference symbols B, E, ... respectively represent coefficients of aspherical surface, and wherein said illumination lens has the following numerical data:

$r_1 = \infty$
$d_1 = 0.4545$  $n_1 = 1.883$  $\nu_1 = 40.78$
$r_2 = \infty$ (aspherical surface)
$P_2 = 1$, $B_2 = 0.44$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

16. An illumination optical system for an endoscope according to claim 1 wherein the first and second surfaces of said illumination lens are respectively formed as aspherical surfaces.

17. An illumination optical system for an endoscope according to claim 16 wherein said first surface formed as an aspherical surface is formed that the central portion thereof is concave and the marginal portion thereof is convex.

18. An illumination optical system for an endoscope according to claim 17 wherein said aspherical surfaces respectively have shapes expressed by the formula (1) shown below:

$$x = \frac{Cy^2}{1 + \sqrt{1 - PC^2y^2}} + by + By^2 + ey^3 + Ey^4 + fy^5 + Fy^6 + \ldots \quad (1)$$

where, $C=1/R$ (where, reference symbol R represents the radius of curvature of the vertex portion of the aspherical surface), reference symbol y represents the radius measured from the optical axis, reference symbol P represents the constant of cone, and reference symbol B, E, ... respectively represent coefficients of aspherical surface, and wherein said illumination lens has the following numerical data:

$r_1 = \infty$ (aspherical surface)
$d_1 = 0.4545$  $n_1 = 1.883$  $\nu_1 = 40.78$
$r_2 = 1.1364$ (aspherical surface)
$P_1 = 1$  $P_2 = 1$
$x_1 = 0.046$, $x_2 = 0.8181$, $Smm = 1.18$
$B_1 = -0.55 \times 10^{-1}$, $F_1 = 0.6442 \times 10^{-2}$
$F_2 = 0.6442 \times 10^{-2}$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

19. An illumination optical system for an endoscope according to claim 17 wherein said second surface of said illumination lens formed as an aspherical surface is formed that the central portion thereof is convex and the marginal portion thereof is concave.

20. An illumination optical system for an endoscope according to claim 1 wherein the second surface of said illumination lens is formed as a surface of the sixth order.

21. An illumination optical system for an endoscope according to claim 20 wherein said surface of the sixth order is expressed by the formula (1) shown below:

$$x = \frac{Cy^2}{1 + \sqrt{1 - PC^2y^2}} + by + By^2 + ey^3 + Ey^4 + fy^5 + Fy^6 + \ldots \quad (1)$$

where, C=1/R (where, reference symbol R represents the radius of curvature of the vertex portion of the surface of the sixth order), reference symbol y represents the radius measured from the optical axis, reference symbol P represents the constant of cone, and reference symbols B, E, ... respectively represent coefficients of aspherical surface, and wherein said illumination lens has the following numerical data:

$r_1 = \infty$
$d_1 = 0.4545$ $n_1 = 1.883$ $\nu_1 = 40.78$
$r_2 = \infty$ (aspherical surface)
$P_2 = 1$, $B_2 = 0.55$, $E_2 = -0.6442 \times 10^{-2}$ where, reference symbols $r_1$ and $r_2$ respectively represent radii of curvature of the first and second surfaces of the illumination lens, reference symbol $d_1$ represents the thickness of the illumination lens, reference symbol $n_1$ represents the refractive index of the illumination lens, and reference symbol $\nu_1$ represents Abbe's number of the illumination lens.

22. An illumination optical system for an endoscope according to claim 1 wherein the aspherical surface of said aspherical lens element has a sectional shape obtained by the combining short straight line segments.

23. An illumination optical system for an endoscope according to claim 1 wherein the aspherical surface of said aspherical lens element has a sectional profile obtained by combining short straight line segments and short curved line segments.

24. An illumination optical system for an endoscope according to claim 1 wherein a light guide is used as said light source and wherein the aspherical surface of said aspherical lens element has a sectional profile formed that the central axis thereof is eccentric from the central axis of said light guide.

25. An illumination optical system for an endoscope according to claim 1 wherein the aspherical surface of said aspherical lens element is formed that the sectional profiles of said aspherical surface on a plural number of sections, which respectively contain the optical axis of said illumination lens, are individually different.

26. An illumination optical system for an endoscope according to claim 1 wherein the aspherical surface of said aspherical lens element is formed by combining a plural number of curved surfaces.

27. An illumination optical system for an endoscope according to claim 1 wherein said illumination lens comprises a plural number of lens elements.

* * * * *